UNITED STATES PATENT OFFICE 2,331,515

CALCIUM SULPHATE PRODUCTION

Roy W. Sullivan, Wilmington, Del., assignor to E. I. du Pont de Nemours & Company, Wilmington, Del., a corporation of Delaware No Drawing. Application February 29, 1940, Serial No. 321,408

9 Claims. (Cl. 23—122)

This invention relates to the production of calcium sulphate, and more particularly to the preparation of hydration-resistant, insoluble anhydrite.

More specifically, the invention relates to the stabilization of insoluble anhydrite and to the production of precipitated, finely-divided anhydrite particularly useful as a pigment or extender; that is, anhydrite which not only possesses satisfactory color and other essential pigmentary characteristics, but is of requisite frequency particle size average, e. g., at least 75% of the particles thereof range within from about .5 to 2 microns diameter, and none exceed an average size of substantially 5 microns.

Calcium sulphate occurs in four modifications which comprise: gypsum ($CaSO_4 2H_2O$); the hemihydrate or plaster of Paris ($CaSO_4 \frac{1}{2} H_2O$); and soluble and insoluble anhydrite. The latter is characterized by a specific X-ray diffraction pattern and occurs naturally or can be obtained by calcining gypsum or plaster of Paris at temperatures above, say, 500° C. Also, it can be obtained by dehydrating gypsum in relatively strong sulphuric acid or may be precipitated by gradually adding slaked lime to about 60° Bé. sulphuric acid and continuing the reaction until neutralization of approximately 85% of acid becomes effected.

At ordinary temperatures insoluble anhydrite, when in contact with water or dilute acid, is unstable and hydrates to gypsum within a relatively short period of time. Simultaneous with said hydration the particle size of said anhydrite increases tremendously. The conditions which prevail during preparation of the anhydrite affect to a large extent its rate of hydration. When, for instance, anhydrite is heat treated at temperatures ranging from about 500 to 700° C., a slightly greater but yet insufficient state of stability towards water results.

The size of the individual anhydrite particles also influences, and to a great extent, its rate of hydration. That is, the smaller the individual particle the greater appears to be the hydration rate. To be adaptable for pigment use, anhydrite must be relatively small and uniform in particle size and, preferably, must be within the range above mentioned. When in such relatively finely-divided condition, however, the anhydrite gives rise to an unusually high rate of hydration and the crystal growth accompanying said hydration completely destroys the usefulness of the anhydrite for pigment purposes. Thus, the average particle diameter of a given anhydrite product, on hydration, will change within one week's time from below substantially 5 microns to as much as 1 to 3 millimeters. Therefore, instead of having a product which is capable of providing on use a fine, smooth, opaque suspension, a coarse, sandy, translucent sediment results which is entirely unsuited for pigment purposes.

The use of various retarders or crystal growth restraining agents, particularly proteinaceous substances such as glue, gelatin, dried blood, slaughter house residue, albuminoids, egg albumen, and similar substances, has been proposed for treating calcium sulphate. Through adsorption or otherwise, these agents tend to protect the crystalline surface of the calcium sulphate from acquiring additional lattice atoms or molecules. Though effective to some degree, none impart to insoluble anhydrite that permanent and sufficiently complete stability towards water which is essential before said anhydrite becomes entirely suited for use as a pigment or pigment extender, especially in water-containing compositions, such as casein paints, emulsion paints, shoe cleaners, etc.

It is among the objects of this invention to overcome these and other disadvantages inherent in prior calcium sulphate production and to provide a novel method for producing a stabilized calcium sulphate which remains free from objectionable gypsum or needle-like crystal particles. A particular object of the invention involves the production of stabilized, insoluble anhydrite which is adapted for direct use as a pigment or extender. A further and particular object relates to the preparation of a relatively finely-divided, insoluble anhydrite product having the outstanding characteristic of relatively complete resistance towards hydration, even after subjection to prolonged contact with water or dilute acids.

These and other objects are attainable in this invention, which comprises stabilizing calcium sulphate, and particularly the insoluble anhydrite modification thereof, with a relatively small amount of a stabilized proteinaceous substance.

In a more specific and preferred embodiment, the invention comprises treating pigment-useful, insoluble anhydrite with a relatively small amount of a proteinaceous substance, preferably glue, and thereafter drying the resulting product at a temperature ranging from substantially 175° C. to about 225° C.

In the preferred adaptation of the invention, after procurance of the anhydrite, in accordance with well-known methods such as those already referred to, I treat the same, either alone or while blended as an extender with a prime or base pigment substance such as titanium oxide, zinc sulphide, zinc oxide, etc., with a relatively small amount, say, from about .05% to about 5%, and preferably from about .1% to 1%, of a water-soluble colloidal protein, preferably glue, or other proteinaceous substance, such as those mentioned above. In effecting treatment of the calcium sulphate, a solution of the protein may be suitably admixed or incorporated in an aqueous slurry or suspension of the anhydrite, which suspension may contain, say, about 20% solids by weight. The resulting slurry may be suitably stirred or otherwise agitated to effect intimate admixture of the ingredients, whereby the protein material becomes intimately associated with and adsorbed upon or coats the individual anhydrite particles with a protective layer or film. In instances where gypsum is dehydrated in strong sulphuric acid, is thereafter washed free from acid and then filter pressed, gypsum formation can be readily prevented if the anhydrite slurry and wash water contain relatively small amounts of the protein material, particularly glue. The pH of the glue or protein solution in which the anhydrite is suspended will have a certain effect upon the hydration-inhibiting characteristics of the protein, and, accordingly, it will be found preferable to maintain the reaction of the system at a pH of not less than 4 and to a range up to 10 or higher. If the anhydrite is produced by dry methods, treatment thereof can be readily effected by mixing the dry anhydrite directly with a small percentage of the water-soluble protein.

After protein treatment of the anhydrite has been suitably effected, the resulting product, upon dewatering, if prepared from an equeous suspension, is suitably dried by subjecting the same to heat treatment at temperatures in excess of substantially 110° C., and particularly within a range of from 150° C. to 250° C., but preferably at from substantially 175° C. to 225° C. Such order of drying temperatures, especially those within said preferred range, will be found highly conducive for effecting desired anhydrite stabilization, and will not only impart hydration resistance characteristics to the calcium sulphate, but will also advantageously stabilize the glue or other proteinaceous material present therein. As a result, any tendency of said material toward decomposition by reason of bacteria presence or fungi growth is effectively prevented.

Alternatively, and in order to procure optimum benefits hereunder, I may utilize in conjunction with said protein treatment a relatively small amount of a preserving or stabilizing agent which will inhibit decomposition or decay of the protein material in said anhydrite, incorporating said preservative in the anhydrite, preferably, after heat treatment of the calcium sulphate. Preferable preservatives comprise well-known antiseptic agents, such as para-chlor meta cresol, methyl para-hydroxy benzoate, para-chlor meta xylol, or their isomers, or such compounds as phenyl mercury hydroxide or phenyl mercury acetate, etc. As already noted, only a relatively small quantity of preserving material, say, from about .01 to about 2 times the amount of proteinaceous material present in the anhydrite need be employed to effect desired results, and in most practical instances the amount used need not exceed, say, from about .05% to about 3% of the anhydrite or pigment material under treatment, a preferred range amount being from about .1% to about 0.2%.

Considerable variation may be had in the method of adding or incorporating the preservative in the calcium sulphate, depending upon the properties of the particular preservative employed. Some preservatives are essentially water-insoluble. It will be found preferable to add these to the protein-treated anhydrite slurry in order to get good intermingling, although, if desired, they may be directly mixed with the dried pigment. Other preservatives are water-soluble. It will be found more economical and preferable to add these to the dried pigment or ultimate product in order to minimize losses in the slurry filtrate which might otherwise occur if the agent were directly added to said pigment slurry. If normally a liquid, the preservative or a solution of the same may be sprayed directly onto the protein-treated pigment, as for instance, in a barrel mixer or in the drier.

To a more complete understanding of the invention the following specific examples are given, these being merely in illustration of and not to be considered as in limitation of my invention:

EXAMPLE I

A 20% aqueous slurry of freshly precipitated anhydrite was adjusted to a pH of 8 with a small amount of sodium hydroxide and then divided into two parts. One part, after being dried at 110° C., was used as a control while to the other .1% of animal glue (0.10 g. per 100 g. CaSO₄) was added. Thereafter, said glue-treated sample was dried at a temperature of approximately 200° C. The two samples were then contacted directly with water and observed for hydration over a period of one month. The following results, expressed as a percentage conversion to gypsum, were obtained:

Table

|  | Time (weeks) | | | |
| --- | --- | --- | --- | --- |
|  | 1 | 2 | 3 | 4 |
|  | Per cent | Per cent | Per cent | Per cent |
| Control | 3.2 | 26.8 | 70 | 85 |
| Glue treated | 0.4 | 0.1 | .2 | .2 |

EXAMPLE II

A sample of pigment, consisting of about 30% TiO₂ and 70% insoluble anhydrite, was calcined for one-half hour at 600° C. and disintegrated. About 100 g. was repulped in 400 cc. of water and the resulting sample stored in a glass container for a period of 15 months and analyzed for calcium sulphate hydration at various intervals. At the end of 9 months, the calcium sulphate had almost completely hydrated to gypsum.

A portion (150 g.) of the same sample, calcined at 600° C., was repulped, treated with 0.1% glue, as above described, filtered and then dried at 175° C. After disintegration, 100 g. were repulped in water and then treated with .1% para-chlor-meta-cresol as a preservative. Upon analyzing this sample for calcium sulphate hydration at the expiration of 9 and 15 months' storage in a glass container, the following results were obtained:

| Standing time | Per cent hydration |
| --- | --- |
|  | *Per cent* |
| 9 months | 1.01 |
| 15 months | 1.98 |

EXAMPLE III

A neutral pigment suspension consisting of about 30% calcined $TiO_2$ and 70% insoluble anhydrite, suspended in 4 parts of water, was treated with 0.1% of glue (on the pigment basis). After thorough mixing, the solids were filtered off and divided into several equal parts. Each part was then separately dried at the temperatures indicated below. Samples were then disintegrated and 125 g. of each were repulped in 500 cc. of distilled water to determine any difference in stability of the calcium sulphate component on long standing in water suspension. Thereupon, approximately one-half of each slurry was transferred to separate containers and treated with either para-chlor-meta-cresol or phenyl mercury hydroxide as a preservative for the glue. The individual samples were then stored in glass containers and analyzed at frequent intervals for calcium sulphate hydration, with the following results, the figures given being the percentage conversion to gypsum:

| Sample | Dried | Treatment | 20 | 40 | 60 |
| --- | --- | --- | --- | --- | --- |
|  | °C. |  |  |  |  |
| 1 | 110 | None | 3.4 | 17.8 | 74.1 |
| 2 | 110 | Preserved | 3.0 | 3.3 | 3.4 |
| 3 | 150 | None | 1.9 | 4.2 | 6.9 |
| 4 | 150 | Preserved | 1.9 | 2.2 | 2.1 |
| 5 | 200 | None | 1.9 | 2.1 | 2.5 |
| 6 | 200 | Preserved | 1.9 | 1.9 | 1.8 |

While I have set out specific methods, temperatures, types and amounts of proteinaceous materials and preservatives hereinabove, the invention is not to be construed as limited thereto. Thus, while Example II illustrates the advantage of drying the protein-treated anhydrite prior to incorporation in an aqueous vehicle, this is merely a preferred procedure. Similarly, the preservative, instead of being incorporated in the calcium sulphate subsequent to its protein treatment, may be added thereto concurrent with the proteinaceous agent treatment. Also, in instances where the preservative is slowly added to the calcium sulphate and a loss arises by reason of its solubility in the filtrate or otherwise, a sufficient amount should be used in such instances as to afford retention of an amount in the pigment adequate for effective treatment. Again, where the slurry contains solids other than anhydrous calcium sulphate, e. g., when the latter is only present as an extender for a prime pigment, the amounts of proteinaceous agent used should be based on the total solids present, whereby the quantity of treating agent applied to the anhydrite comes within the effective and desired range.

Although specific organic compounds have been suggested as useful preservatives for inhibiting bacterial decay in the proteinaceous agent, these are merely preferred. In general, I contemplate using all compounds, whether organic or inorganic, and especially those of a bactericidal nature, which function to preserve or stabilize said proteinaceous material, whereby its decomposition or decay becomes effectively prevented. Well-known medicinal or antiseptic compounds, as well as those which are mold-inhibiting in character, are especially advantageous for use. In addition to those mentioned, other organic compounds, including the well-known mercurials, or various types of inorganic compounds, such as the arsenicals, may also be used. Among compounds of the latter type the arsenates, e. g., salts of arsenic acid which contain the trivalent $AsO_4^{---}$ radical, especially those of sodium, potassium, calcium, etc., may be mentioned.

It will be found desirable to employ in the invention drying temperatures within the ranges designated above, e. g., temperatures ranging from substantially 150° C. to not exceeding substantially 250° C., and preferably from about 175° C. to about 225° C. The value of controlling the temperatures employed to produce anhydrite which is substantially completely stable and hydration-resistant is apparent from the data given in Example III. The striking increase in stability arising by reason of use of the temperature ranges given is entirely unexpected and somewhat difficult to explain. Seemingly, and especially in the instance of glue treatment, the heat treatment has the effect of toughening or thermally conditioning the adsorbed protein layer or film surrounding the anhydrite particles, rendering said anhydrite more impervious to water. This conditioning is especially notable when the glue-treated anhydrite is subjected to drying within temperatures of 175° C. to 225° C.

As will be evident, the invention comprises, in the preferred preparation of a water-stable calcium sulfate, the features (1) drying the protein-treated pigment at preferred temperature ranges, and (2) use of a preservative which functions to additionally prevent decomposition of the protein stabilizing agent. Also, it affords the production of pigment-useful, insoluble anhydrite effectively stabilized against hydration. The resulting anhydrite will be found to be relatively free from any tendency to grow or increase in size when directly contacted with aqueous media, even after prolonged periods of exposure. Thus, formation of gypsum, with consequent increase in anhydrite particle size, which would deleteriously affect the usefulness of the anhydrite for pigment purposes, becomes avoided. As is known, the presence of gypsum results in (1) poor pigment texture and (2) loss in pigment tinting strength and hiding power. The retention of these characteristics is obviously essential and necessary if the product is to be commercially useful as a pigment.

I claim as my invention:

1. A process for producing pigment-useful, insoluble anhydrite substantially stable and resistant towards hydration which comprises intimately associating a relatively small amount of a proteinaceous substance with said insoluble anhydrite while in aqueous suspension and thereafter stabilizing the resulting composition by heat treating the same at temperatures ranging from substantially 150° C. to 250° C.

2. A process for producing pigment-useful, insoluble anhydrite substantially resistant towards hydration which comprises intimately associating with said insoluble anhydrite while the same is in aqueous suspension a relatively small amount of a proteinaceous substance, and thereafter stabilizing the resulting composition by drying the same at temperatures ranging from substantially 175° C. to 225° C.

3. A process for producing pigment-useful, insoluble anhydrite substantially resistant towards hydration which comprises intimately associating with said insoluble anhydrite while the same is in aqueous suspension a relatively small amount of glue, and thereafter stabilizing the resulting composition by drying the same at temperatures ranging from substantially 175° C. to 225° C.

4. A process for producing pigment-useful, insoluble anhydrite substantially resistant towards hydration which comprises intimately associating with said insoluble anhydrite while the same is in aqueous suspension from 0.5% to about 5% of glue, and thereafter stabilizing the resulting composition by drying the same at temperatures ranging from substantially 150° C. to 250° C.

5. A process for producing pigment-useful, insoluble anhydrite substantially resistant towards hydration which comprises intimately associating with said insoluble anhydrite while in aqueous suspension a small amount of a proteinaceous substance together with a stabilizing agent for said substance, and thereafter subjecting the resulting composition to heat treatment at temperatures ranging from substantially 150° C. to 250° C.

6. A process for producing pigment-useful, insoluble anhydrite substantially resistant towards hydration which comprises intimately associating with said insoluble anhydrite while in aqueous suspension a small amount of a proteinaceous substance together with from 0.5% to 3% of a stabilizing agent for said substance, and thereafter subjecting the resulting composition to heat treatment at temperatures ranging from substantially 150° C. to 250° C.

7. A process for producing improved, pigment-useful, insoluble anhydrite substantially stable and resistant towards water which comprises treating said insoluble anhydrite while in aqueous suspension with from about .05% to 5%, based on the weight of the solids present in said suspension, of a water-soluble, colloidal protein, dewatering the resulting mixture, drying the recovered anhydrite composition at a temperature ranging from substantially 150° C. to 250° C. and incorporating in the dried product from about .05% to 3% of a preserving agent adapted to inhibit bacterial decay of said protein.

8. A process for producing improved, pigment-useful, insoluble anhydrite substantially stable and resistant towards hydration which comprises treating said insoluble anhydrite while in aqueous suspension with from about .05% to 5%, based on the weight of the solids present, of glue, together with a small amount of a preservative for said glue, thereafter dewatering the resulting mixture and drying the treated anhydrite at a temperature ranging from substantially 175° C. to 225° C.

9. A process for producing pigment-useful, insoluble anhydrite substantially stable against hydration which comprises admixing from about .1% to 5% of glue with precipitated insoluble anhydrite while in aqueous suspension and thence drying the resulting mixture at a temperature between about 175° C. and 225° C., in the presence of from about .1% to about 2% of a preserving agent for said glue which is adapted to retard bacterial decomposition therein.

ROY W. SULLIVAN.